UNITED STATES PATENT OFFICE.

ALEXANDER P. F. GAMMACK, OF BERLIN, CONNECTICUT, ASSIGNOR OF ONE-HALF TO CHARLES M. JARVIS, OF SAME PLACE.

COMPOSITION FOR KILLING WEEDS.

SPECIFICATION forming part of Letters Patent No. 615,444, dated December 6, 1898.

Application filed February 19, 1898. Serial No. 670,807. (No specimens.)

*To all whom it may concern:*

Be it known that I, ALEXANDER P. F. GAMMACK, a subject of the Queen of Great Britain, residing at Berlin, in the county of Hartford and State of Connecticut, have invented a new and useful Composition of Matter to be Used for Killing and Preventing the Growth of Weeds, of which the following is a specification.

My composition consists of the following ingredients in the proportions stated, viz: arsenic, (As,) two hundred and eighty parts; carbonate of sodium, ($Na_2CO_3$,) one hundred and forty parts; perchlorid of mercury, ($HgCl_2$,) fifty-six parts; ammonium chlorid, ($NH_4Cl$,) fifty-six parts; anilin blue-black, one part; creosote, seven hundred parts; water, five thousand six hundred parts. The solid constituents are to be mixed separately, added to the water, and boiled at a temperature between 212° and 300° Fahrenheit for twenty minutes or until completely dissolved. On cooling the creosote is to be added and the whole put in air-tight containers to prevent volatilization of the creosote.

The composition is designed for use upon walks and driveways or any place where it is desired to kill and prevent all vegetable growth. For use one part of the composition is placed in nine parts of water and the reduced composition is slightly sprinkled where the weeds or vegetable growth is not wanted. In the course of from two to five days it will destroy all vegetation with which it has come in contact, and no other surface vegetation will grow there for the space of at least six months. Though composed of poisonous ingredients, it is perfectly safe to use, because, being in solution and applied only in small quantity, it is immediately absorbed by the ground and rendered harmless.

Although arsenic will itself destroy vegetation, a distinct improvement is found in the combination with it of perchlorid of mercury, ($HgCl_2$,) inasmuch as the mercuric salt is a very powerful adjuvant of the arsenic, allowing it to be effectively used in a much weaker solution than would otherwise be possible. Although the proportion given is believed to be the best known to me, it may be somewhat varied and still accomplish the purpose of my invention.

The carbonate of sodium acts merely as a solvent of the arsenic, assisting materially in its solution and rendering the solution stable. Other alkaline carbonates acting in the same way may be substituted therefor. The ammonium chlorid forms a double salt with the mercuric chlorid, and thus prevents the decomposition of the per into the sub chlorid— an insoluble salt.

The creosote is mainly to give odor and prevent people from using the composition by mistake, while the anilin blue-black is a mere coloring agent, not properly a part of the compound. Other odoriferous ingredients may be substituted for the creosote, and other coloring-matter for the anilin blue-black, or both of them may be omitted altogether, without changing the character of the composition as to its effect on vegetation.

What I claim, and desire to secure by Letters Patent, is—

1. The herein-described composition of matter, consisting of water, arsenic, carbonate of sodium, perchlorid of mercury and ammonium chlorid, substantially as described and for the purposes specified.

2. The herein-described composition of matter, consisting of water, arsenic, carbonate of sodium, perchlorid of mercury, ammonium chlorid, and odoriferous and coloring ingredients, substantially as described and for the purposes specified.

ALEXANDER P. F. GAMMACK.

Witnesses:
A. W. STIPEK,
JAMES SHEPARD.